US006733568B2

(12) United States Patent
De-Souza et al.

(10) Patent No.: US 6,733,568 B2
(45) Date of Patent: May 11, 2004

(54) METHOD OF CONTROLLING A PLANT FOR PROCESSING A GAS BY ADSORPTION AND CORRESPONDING PROCESSING PLANT

(75) Inventors: Guillaume De-Souza, Issy les Moulineaux (FR); Pierre-Olivier Dolle, Paris (FR); Yves Engler, Chatou (FR)

(73) Assignee: L'Air Liquide, Société Anonyme á Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 10/365,014

(22) Filed: Feb. 12, 2003

(65) Prior Publication Data

US 2003/0167920 A1 Sep. 11, 2003

(30) Foreign Application Priority Data

Feb. 13, 2002 (FR) .............................................. 02 01767

(51) Int. Cl.$^7$ ............................................. B01D 53/047
(52) U.S. Cl. ....................... 95/26; 95/11; 95/12; 95/21; 95/96; 96/109; 96/115; 96/130
(58) Field of Search ........................... 95/11, 12, 21–23, 95/26, 96–106; 96/109, 111, 114, 115, 130

(56) References Cited

U.S. PATENT DOCUMENTS

| 3,703,068 | A | * | 11/1972 | Wagner ........................... 95/11 |
|---|---|---|---|---|
| 4,234,322 | A | * | 11/1980 | De Meyer et al. ............... 95/19 |
| 4,299,595 | A | * | 11/1981 | Benkmann et al. .............. 95/1 |
| 4,323,370 | A | * | 4/1982 | Leitgeb ........................... 95/23 |
| 4,350,500 | A | * | 9/1982 | Esselink ....................... 95/100 |
| 4,360,362 | A | * | 11/1982 | Asztalos .......................... 95/1 |
| 4,375,363 | A | * | 3/1983 | Fuderer .......................... 95/97 |
| 4,512,778 | A | * | 4/1985 | Simonet et al. ............... 95/100 |
| 4,927,434 | A | * | 5/1990 | Cordes et al. .................. 95/15 |
| 4,981,499 | A | * | 1/1991 | Hay et al. ..................... 95/100 |
| 5,529,607 | A | * | 6/1996 | Tan ................................ 95/12 |
| 5,702,504 | A | * | 12/1997 | Schaub et al. ................ 95/101 |
| 5,733,359 | A | * | 3/1998 | Doong et al. .................... 95/8 |
| 5,964,924 | A | * | 10/1999 | Engler et al. ................... 95/98 |
| 5,989,313 | A | * | 11/1999 | Mize ............................ 95/10 |
| 6,063,161 | A | | 5/2000 | Keefer et al. |
| 6,224,651 | B1 | | 5/2001 | Monereau et al. |
| 6,270,556 | B1 | * | 8/2001 | Rouge et al. ................... 95/22 |
| 6,315,818 | B1 | * | 11/2001 | Monereau ...................... 95/98 |
| 6,383,256 | B1 | * | 5/2002 | Phillips ......................... 95/12 |
| 6,454,838 | B1 | * | 9/2002 | Xu et al. ........................ 95/98 |
| 2002/0134234 | A1 | * | 9/2002 | Kalbassi et al. ............... 95/11 |

FOREIGN PATENT DOCUMENTS

| DE | 4239615 A | 5/1993 |
|---|---|---|
| EP | 0793991 A | 9/1997 |

OTHER PUBLICATIONS

French Search Report to FR 02 01767.

* cited by examiner

*Primary Examiner*—Robert H. Spitzer
(74) *Attorney, Agent, or Firm*—Linda K. Russell

(57) ABSTRACT

A method of controlling a plant for processing a gas by adsorption, with N adsorbers R1 to R0 and variable N phase times. The method utilizes a mobile parameter for identifying the operating state of N adsorber which is in each successive phase time of the cycle. For a given phase time, a parameterized sequence (S, S') of control steps for the plant are defined. A control sequencer of the plant is generated by matching an adsorber (R1 to R0) with each mobile parameter of the parameterized sequence during each phase time of the cycle, causing the succession of phase times of the cycle to be followed at all the adsorbers in operation.

22 Claims, 6 Drawing Sheets

METHOD OF CONTROLLING A PLANT FOR PROCESSING A GAS BY ADSORPTION AND CORRESPONDING PROCESSING PLANT

The present invention relates to a method of controlling a plant for processing a gas by adsorption, having N adsorption units.

It also relates to a plant for processing a gas by adsorption, which is controlled using such a method.

In order to ensure correct operation of a plant for processing a gas by adsorption provided with a plurality of cyclically working adsorbers, it is known to employ a sequencer, that is to say an ordered set of control operations of the adsorbers. These sequencers prove particularly useful when the plant has a large number of adsorbers, which are subjected selectively or simultaneously on the one hand to external supply and regeneration flows and, on the other hand, to flows coming from the other adsorbers, with a sequencer grouping together in a structured way hundreds of commands for actuating valves of these adsorbers, with a view to ensuring cyclic operation of the plant.

Furthermore, there is an ever-increasing demand for processing plants using adsorbers to operate with a high level of reliability and stability. Hence, even if one or more adsorbers are temporarily out of service because of a maintenance operation or an unforeseen incident, such as a valve breakage, it is desirable for these plants to continue to operate in an exceptional mode, that is to say for them to be able to continue to produce a flow of processed gas, with a flow rate and a purity which are substantially similar to those of the processed gas flow in the normal mode.

The transition between the normal mode and an exceptional mode needs to be fast and to entail the least possible perturbations of the outgoing processed gas flow, with a view to ensuring continuity of downstream plants consuming the processed gas.

It proves particularly complex for the control method of such a plant to take these various operating modes into account, because of the very large number of envisageable situations. It is hence necessary to accommodate all the possibilities for isolation of adsorbers and occurrence of a production incident, without thereby lengthening the reaction time of the plant.

It is an object of the invention to provide a method of controlling a plant for processing a gas by adsorption, of the aforementioned type, which makes it possible to reduce greatly the programming workload of a control unit reproducing this method, and to improve the reaction capacities of a corresponding plant.

To that end, the invention relates to a method of controlling a plant for processing a gas by adsorption, which plant has N adsorption units, N being greater than or equal to two, operating according to a cycle which is distributed uniformly into at most N phase times and during a part of which at least one of the adsorption units is subjected to the output flow of at least one of the other adsorption units, in which at least one control sequencer is used which determines the control steps of the N adsorption units over a cycle and which ensures, in a loop on itself, cyclic operation of the processing plant, and in which, on the basis of the control steps of the processing plant which occur during a given phase time of a cycle of an operating mode of the plant, said sequencer of said operating mode is obtained by extrapolation to the other phase times of the cycle.

According to other characteristics of this method, taken individually or in any technically feasible combinations:

a mobile parameter for identifying the operating state of the adsorption unit which is in each successive phase time of the cycle is firstly associated with said phase time; for the given phase time, a parameterized sequence of control steps of the processing plant during said given phase time is then defined, each adsorption unit controlled by the steps of said sequence being denoted by the parameter for identifying the operating state of said adsorption unit; and a control sequencer of the processing plant is lastly generated by matching an adsorption unit with each mobile parameter of the parameterized sequence during each phase time of the cycle, so as to cause the succession of phase times of the cycle to be followed at all the adsorption units in operation;

a normal-mode control sequencer of the processing plant is generated for N adsorption units in operation;

each step of the parameterized sequence of the normal-mode sequencer is denoted by a mobile parameter and a step number;

for each isolated adsorption unit, a fixed parameter for identifying the isolated state of the isolated unit is introduced before defining the parameterized sequence, and when the control sequencer of the processing plant is being generated, the or one of the isolated adsorption units is matched with the or each fixed parameter during all the phase times of the cycle, generating an exceptional-mode control sequencer of the processing plant;

each step of the parameterized sequence of the exceptional-mode sequencer is denoted by the fixed parameter or parameters, a mobile parameter and a step number;

at least one parameterized sequence is provided for transition between the parameterized sequence of the normal-mode sequencer and the parameterized sequence of the exceptional-mode sequencer of the processing plant;

each step of the parameterized position transition sequence is denoted by a mobile parameter of the sequence of the normal-mode sequencer, the fixed parameter or parameters, a mobile parameter of the sequence of the exceptional-mode sequencer and a reference number;

the exceptional-mode sequencer is a maintenance-mode control sequencer of the processing plant for substantially half the isolated adsorbers;

the generated sequencer is obtained by looping the parameterized sequence on itself as many times as the cycle has phase times, and by matching the corresponding adsorption unit with each parameter during each loop; and the corresponding adsorption unit is matched with each parameter by means of a correspondence table.

The invention also relates to a plant for processing a gas by adsorption, having on the one hand N adsorption units, N being greater than or equal to 2, which operate according to a cycle which is distributed uniformly into at most N phase times and during a part of which at least one of the adsorption units is subjected to the output flow of at least one of the other adsorption units, said N adsorption units being connected to a pipe for supplying gas to be processed, to a pipe for producing processed gas, to a pipe for collecting a residual gas flow, and being provided with pipes and valves both for connecting the adsorption units to one another and for connecting the adsorption units to said supply, production and connection pipes; and on the other hand a unit for controlling the plant, which defines at least one control sequencer of the adsorption units, ensuring cyclic operation of the plant, in which at least one sequencer of the control unit is obtained by applying the control method as defined above, and at least some of the connection valves are respectively denoted by a parameter of the parameterized sequence generating at least one sequencer of the control unit.

According to one advantageous characteristic of this plant, the valves denoted by a parameter of the parameterized sequence are distributed into sets of valves as a function of the use of the gas which passes through the valves of the same set, and each of the valves denoted by a parameter is also denoted by the number of the set to which the corresponding valve belongs.

The invention will be understood more clearly on reading the following description, which is provided solely by way of example and is given with reference to the appended drawings, in which.

Figure 1:
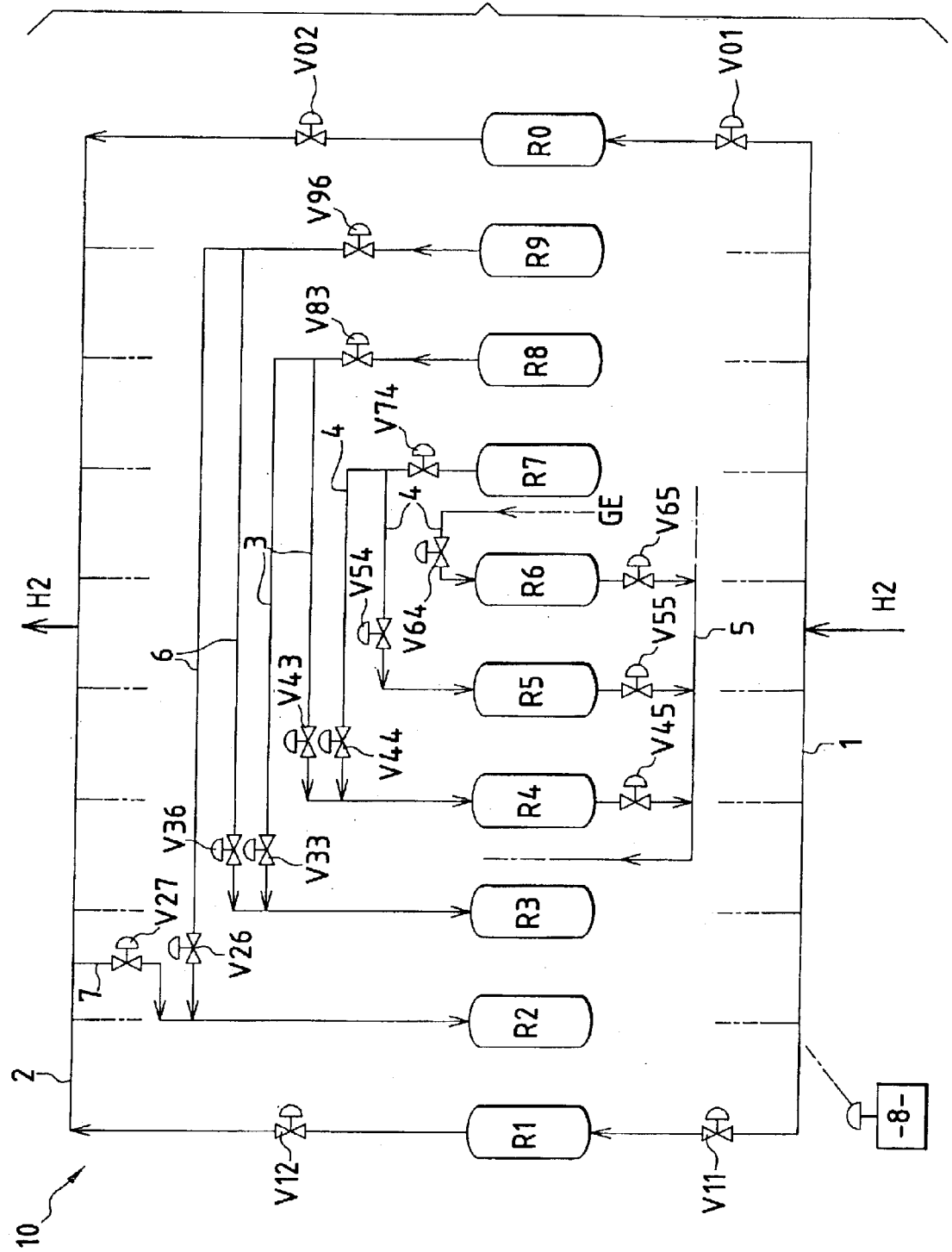
FIG. 1 is a partial schematic view of a plant for processing a gas by adsorption according to the invention.
Figure 7:
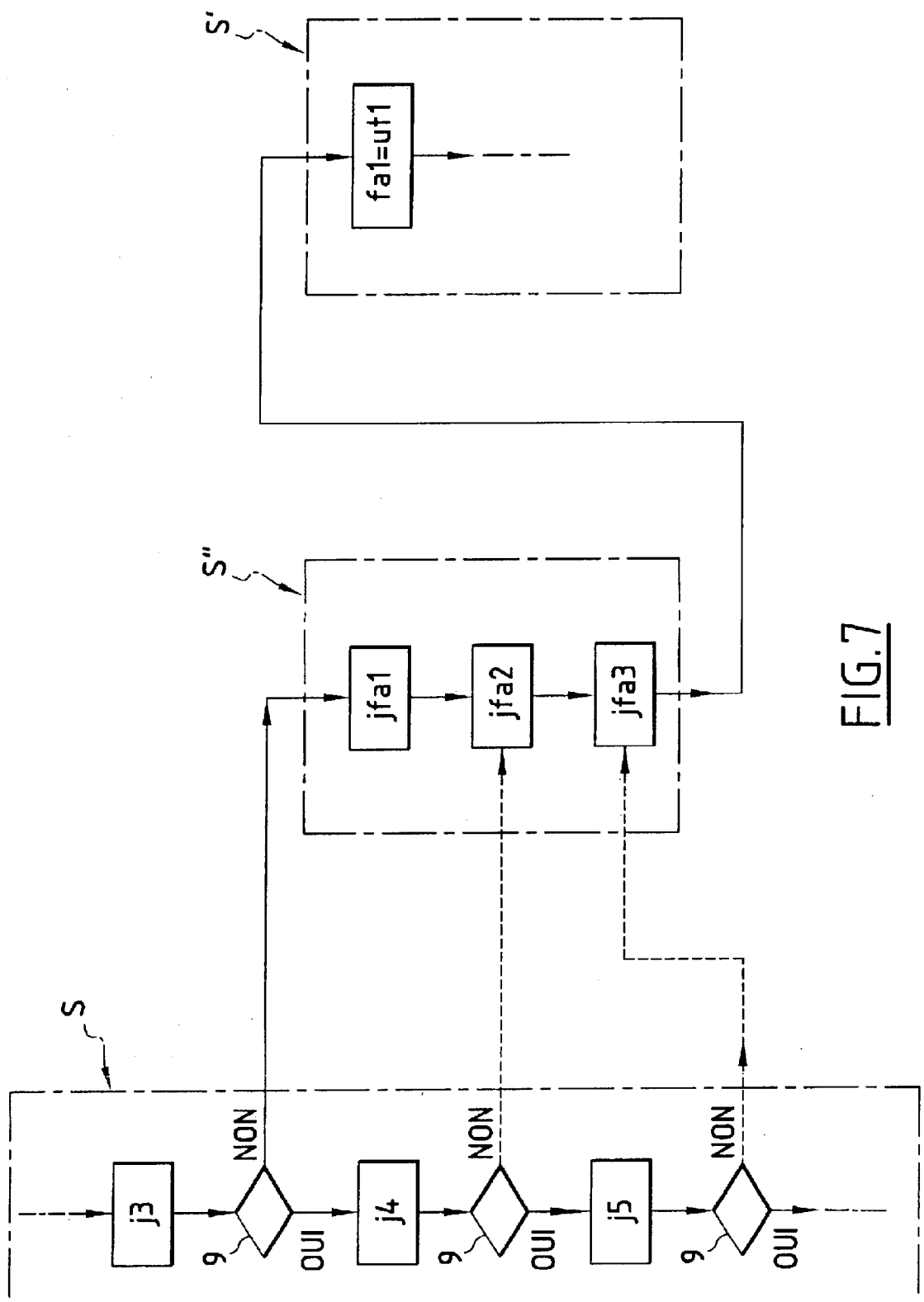

and FIG. 7 is a flow chart explaining a transition sequence between the normal mode and an exceptional mode of the plant in FIG. 1.

FIG. 1 represents a plant 10 for processing an impure hydrogen flow, intended to purify this flow with respect to impurities which it contains, such as water, carbon monoxide, nitrogen, methane, carbon dioxide, hydrocarbons, etc.

To that end, the plant 10 has a pipe 1 for supplying hydrogen to be purified, a pipe 2 for producing purified hydrogen and ten adsorbers, respectively referenced R1, R2, R3, . . . , R9 and R0. Each adsorber has a bottle containing one or more adsorbent materials capable of retaining all or some of the aforementioned impurities when the hydrogen flow to be processed passes through them. This or these materials are regenerable, that is to say that they are capable of giving up previously adsorbed impurities. To that end, the plant 10 has a pipe 5 for collecting residual gas loaded with the desorbed impurities coming from adsorbers which are being regenerated. The plant 10 may also have a line for provision of an elution gas GE, for example taken from the production pipe 2 or coming from a permeate of a membrane unit (not shown).

The plant 10 also has on the one hand pipes, for instance the pipe 7, for connection between the aforementioned pipes 1, 2 and 5 and the adsorbers R1 to R0, and the other hand pipes 3, 4 and 6 for connecting the adsorbers R1 to R0 to one another, one of the connection pipes 4 being connected to the line for provision of elution gas GE. The precise arrangement of the pipes 3, 4, 6 and 7 will become more clearly apparent during the description of the operation of the plant 10. Furthermore, all these connection pipes are provided with valves for regulating the flow rate of gas which passes through them, the arrangement of which will also become apparent during the description of the operation of the plant.

The plant 10 furthermore has a unit 8 for controlling the adsorbers of the plant. The programming and operational details of this unit will be discussed below.

Figure 2:
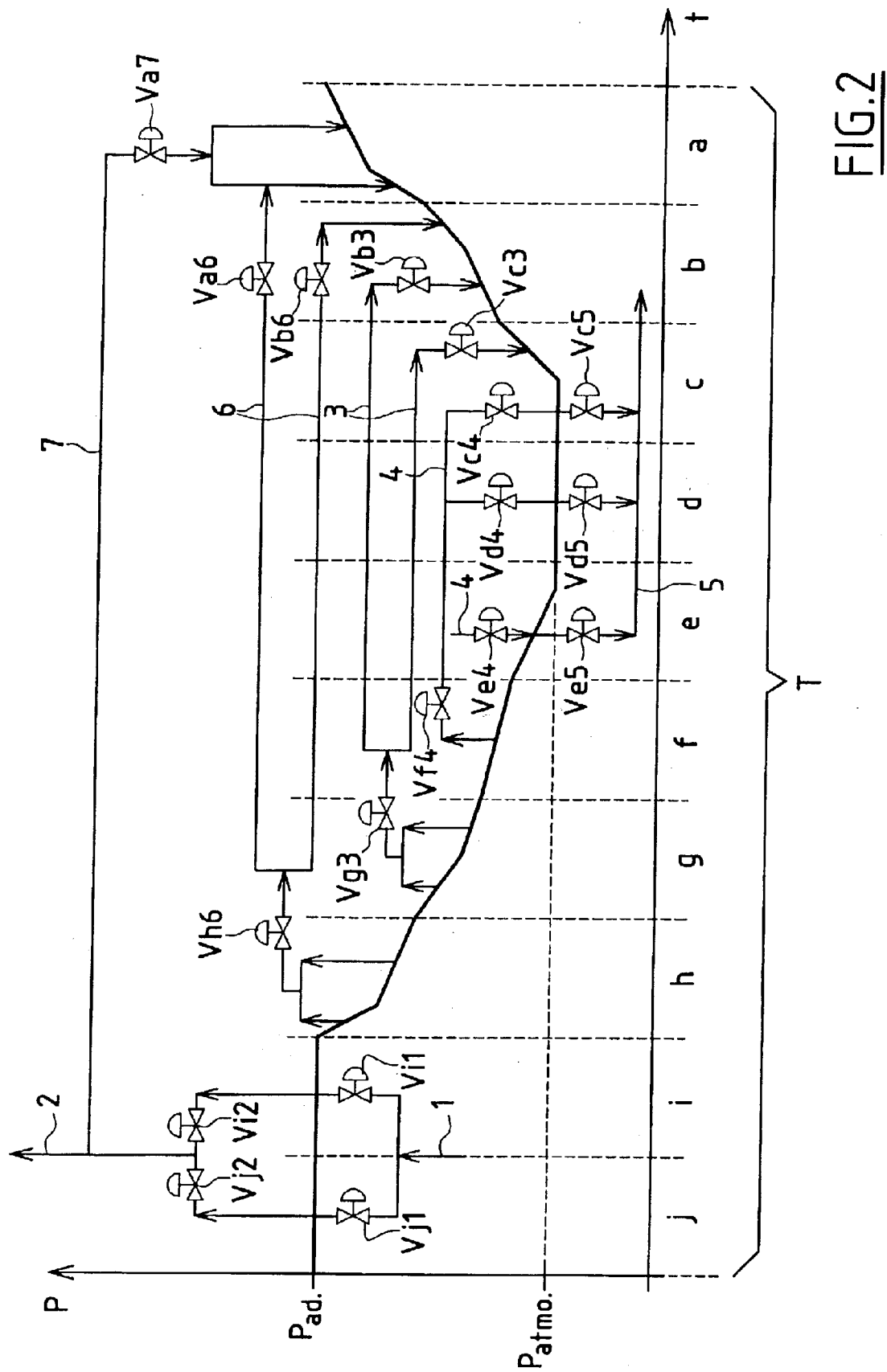
FIG. 2 is a diagram of the operating cycle of the adsorbers of the plant in FIG. 1, in which various operating states a, b, . . . , j are represented.

FIG. 2 illustrates an operating cycle of the plant 10. In this figure, where the times t are plotted on the ordinate and the absolute pressures P are plotted on the abscissa, the lines with directional arrows indicate the movements and destinations of the gas streams, and furthermore the respective circulation direction in the adsorbers R1 to R0: when an arrow is in the direction of increasing ordinates (towards the top of the diagram), the stream is referred to as cocurrent in the adsorber. If the upwardly directed arrow lies below the line indicating the pressure in the adsorber, the stream enters the adsorber through the inlet end of this adsorber; if the upwardly directed arrow lies above the line indicating the pressure in the adsorber, the stream leaves the adsorber through the outlet end of this adsorber, the inlet and outlet ends being respectively those for the gas to be processed and for the gas drawn off in a production phase; when an arrow is in the direction of decreasing ordinates (towards the bottom of the diagram), the stream is referred to as countercurrent in the adsorber. If the downwardly directed arrow lies below the line indicating the pressure in the adsorber, the stream leaves the adsorber through the inlet end of this adsorber; if the downwardly directed arrow lies above the line indicating the pressure in the adsorber, the stream enters the adsorber through the outlet end of this adsorber, the inlet and outlet ends still being those for the gas to be processed and for the gas drawn off in a production phase.

Each adsorber R1 to R0 follows the cycle in FIG. 2, while being offset in relation to the adsorber preceding it by a duration which is referred to as "phase time" and is equal to the duration T of the cycle divided by ten, that is to say divided by the number of adsorbers in operation. The cycle in FIG. 2 therefore has ten phase times and illustrates "phase time/adsorber" duality, namely that each adsorber is in a different phase time at any instant of the operation of the plant 10, which equates to saying that at any instant of the operation of the plant, the operating state of an adsorber is determined by the phase time in which this adsorber is.

In order now to understand the control method implemented by the control unit 8, the operation of the plant 10 will firstly be explained by merely describing the operation of the adsorbers R1 to R0 during a single phase time, given that the operation of the adsorbers during the rest of the cycle is derived through repetition by offsetting the order of the adsorbers.

Figure 3:
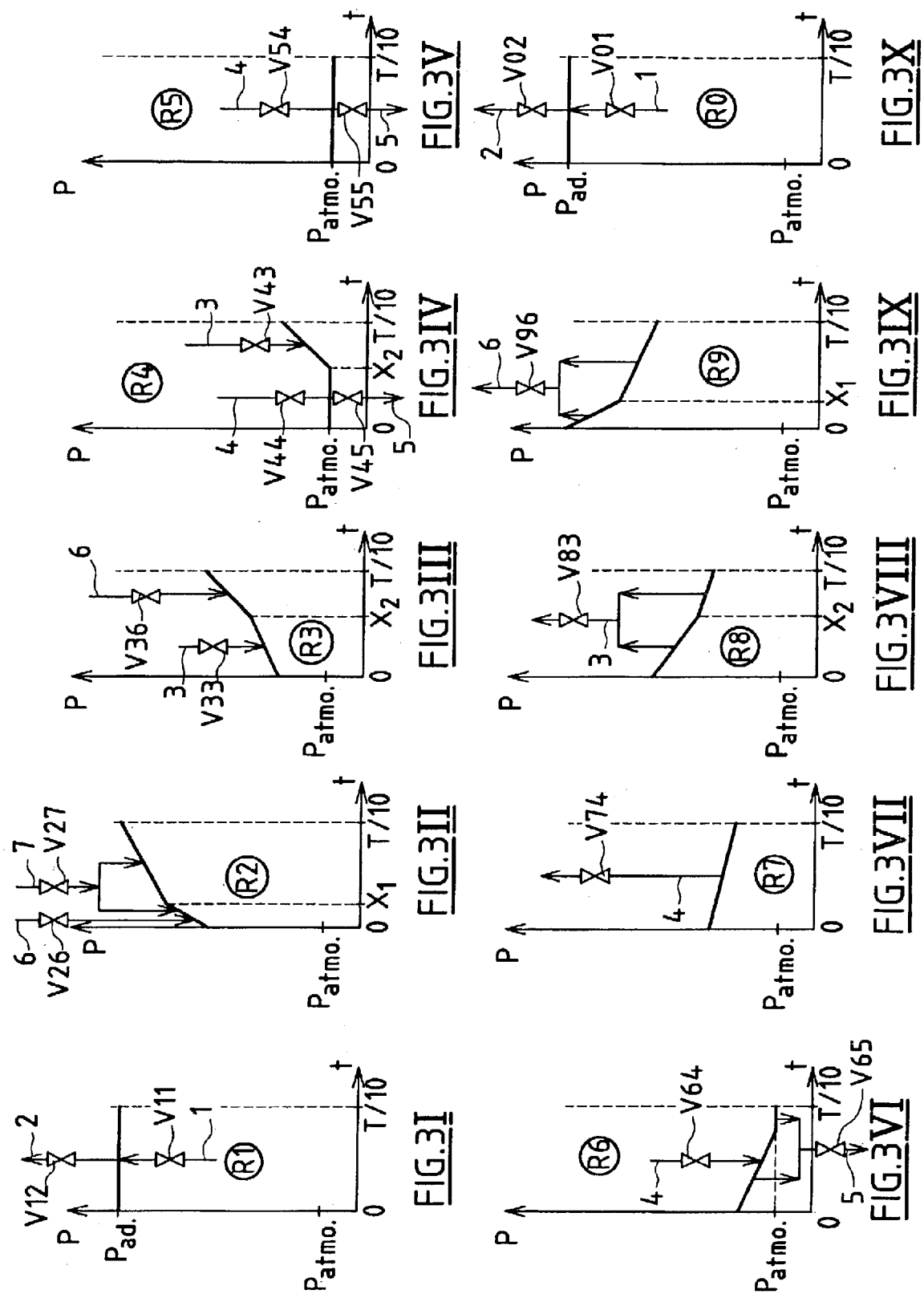
FIGS. 3I to 3X are diagrams respectively associated with the adsorbers of the plant in FIG. 1, and illustrating the same phase time of the cycle in FIG. 2.

To that end, the phase time during which the adsorber R1 is the "master" will be considered as an example, that is to say it is beginning its adsorption phase at a high pressure $P_{ad}$ greater than atmospheric pressure $P_{atmo}$, as illustrated in FIG. 3I. Concomitantly, the adsorber R2 follows the diagram in FIG. 3II, the adsorber R3 follows the diagram in FIG. 3III, and so on until the adsorber R0, which follows the diagram in FIG. 3X.

To assist reading, only the valves which are open during at least a part of this phase time, denoted for convenience between the times $t=0$ and $t=T/10$, are represented in FIGS. 1 and 3I to 3X. For ease of numbering, these valves will be always designated below by the letter V followed by two characters X Y according to the following conventions:

X is the number of the adsorber with which the valve is associated, and

Y is the number of a set of valves having the same function and associated with one of the pipes of the plant, the number 1 being associated with a "supply" function of the pipe 1, the number 2 being associated with a "production" function of the pipe 2, the number 3 being associated with a "lower pressure balancing" function of the connection pipes 3, the number 4 being associated with an "elution" function of the connection pipes 4, the number 5 being associated with a "removal of the residual gas" function of the pipe 5, the number 6 being associated with an "upper pressure balancing" function of the connection pipes 6, and the number 7 being associated with a "final pressure balancing" function of the connection pipe 7.

It Is important to note that the arrangement of the valves for implementing the operation of the plant 10 is deliberately simplified, both for ease of description and for ease of representation; particular arrangements having, in particular, fewer valves by virtue of transverse pipes at any plant, for example, are within the competence of the person skilled in the art without departing from the scope of the invention.

Prior to the start of the phase time represented in FIGS. 3I to 3X, that is to say before the instant $\underline{t}$=0, the valves V01, V02, V45 and V55 are open during at least the end of the phase time preceding the phase time in question, which is represented in FIGS. 3I to 3X. During the latter, the adsorbers R1 and R0 are in an adsorption phase, the other adsorbers being in a regeneration phase.

More precisely, at the instant t=0:

in addition to the valves V01 and V02, the valves V11 and V12 are opened in order to ensure production of a part of the purified hydrogen flow;

the valves V26, V27 and V96 are opened in order to make it possible to recompress the adsorber R2 by using at least a part of the flows coming respectively from the adsorbers R1, R9 and R0;

the valves V33 and V83 are opened in order to make it possible to recompress the adsorber R3 by using the flow coming from the adsorber R8;

the valves V64 and V65 are opened in order to make it possible to bring the pressure of the adsorber R6 to the low pressure of the cycle, and in order to make it possible to elute the adsorbent material of the bottle R6; and in addition to the valve V55, the valves V54 and V74 are opened in order to make it possible to elute the adsorber R5 by using the flow coming from the adsorber R7.

Furthermore, substantially concomitantly with this instant $\underline{t}$=0, the valves for setting in production the adsorber R9, which was in the adsorption phase during the phase time preceding the phase time detailed in FIGS. 3I to 3X, are closed.

Then, starting from the instant $\underline{t}$=x$_1$ when the pressure in the adsorber R2 is substantially equal to the pressure in the adsorber R9:

the valves V26 and V96 are closed, the subsequent recompression of the adsorber R2 therefore being slower.

Then, starting from the instant $\underline{t}$=x$_2$ when the pressure in the adsorber R3 is a substantially equal to the pressure in the adsorber R8:

the valve V33 is closed and the valve V43 is opened, in order to make it possible to begin the repressurisation of the adsorber R4;

the valves V44 and V45 are closed, all of the flow coming from the adsorber R7 then being fed to the adsorber R5; and the valves V36 and V96 are opened in order to make it possible to recompress the adsorber R3 further by using the flow coming from R9.

Lastly, at the instant $$t = \frac{T}{10}$$

when the pressure in the adsorber R2 is substantially equal to the pressure in the adsorber R1, the valves V27, V96, V83, V74, V33, V43 and V36 are closed in order to change from the described phase time to the next phase time.

The operation of the plant 10 during the other phase times of the cycle is derived from the above operation, by treating the adsorber R2 as the master during the next phase time, then the adsorber R3, and so on until the adsorber R0.

Taken together, the control operations of the valves of the plant, for all ten phase times of the cycle, form what is commonly referred to as a control sequencer of the unit 8, which is to be implemented, that is to say input, manually for the plants found in the prior art.

The method according to the invention makes it possible to obtain the sequencer of the unit 8 much more reliably and much faster, as will be explained below.

To that end, parameters are introduced: a parameter for identifying the operating state of the adsorber which is in each successive phase time of the cycle is firstly associated with this phase time.

For instance, over the cycle time represented in FIG. 2, the state parameter j is associated with the phase time in which the adsorber begins its adsorption phase, the state parameter $\underline{i}$ is associated with the phase time which follows, and in which the adsorber ends its adsorption phase, the state parameter $\underline{h}$ is associated with the phase time which follows, and in which the adsorber begins its depressurisation, and so on for the parameters $\underline{g}$, $\underline{f}$, $\underline{e}$, $\underline{d}$, $\underline{c}$, $\underline{b}$ and $\underline{a}$. These state parameters are indicated on the abscissa of the diagram in FIG. 2. It is hence necessary to introduce as many parameters as there are phase times.

These parameters are furthermore referred to as "mobile", in so far as they can correspond to any of the ten adsorbers, depending on the relevant moment of the cycle. For instance, if at a given instant a parameter $\underline{j}$ corresponds to the adsorber R1 ($j$=1), at the end of a duration equal to one fifth of the cycle time T (that is to say equal to twice the duration of a phase time), this parameter $\underline{j}$ will correspond to the adsorber R3 ($j$=3).

A parameterized sequence of control steps of the plant 10 is then defined during only one given phase time, each adsorber being denoted not by its number but by the identification parameter of the operating state of this adsorber during the time period relating to the selected phase time. In other words, this equates to describing the operation of the plant, over a given phase time, in the same way as was described with reference to FIGS. 3I to 3X but while denoting each adsorber by one of the variable parameters $\underline{a}$, $\underline{b}$. . . , $\underline{j}$, as a function of the selected phase time.

Figure 4:
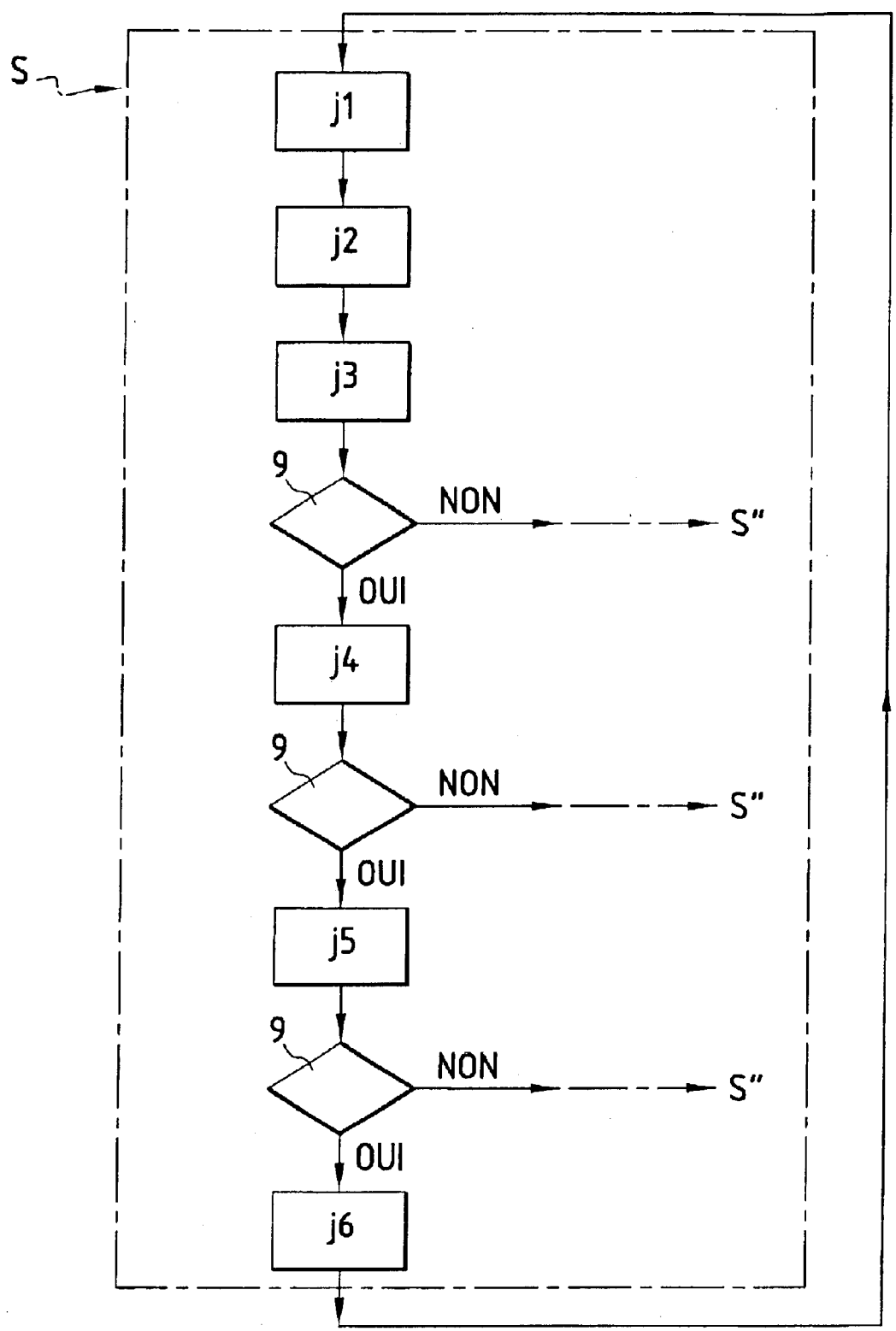
FIG. 4 is a flow chart explaining a parameterized sequence for the normal mode of the plant in FIG. 1.

FIG. 4 hence schematically represents this sequence, noted S. It has six steps denoted j1, j2, . . . , j6 as well as three branching conditions 9. Advantageously, each step of the sequence S is noted by the parameter associated with the "master" phase time and by an increasing step number. The adsorber corresponding to the parameter "x" will be designated by Rx below for ease of writing.

More precisely, the step j1 is a valve movement step including the instructions for opening the valves Vj1 and Vj2 in order to start the production of the adsorber Rj, for opening the valves Ve4 and Ve5 in order to connect the adsorber Re to the pipe for collecting residual gas, and for opening the valve Va7 in order to allow final repressurisation of the adsorber Ra.

The step j2 is a valve movement step including the instructions for closing the valves Vj1 and Vj2 to end the production of the adsorber Rh, for opening the valves Vg3 and Vb3 in order to start the pressure balancing between the adsorbers Rg and Rb, and for opening the valves Vf4 and Vd4 in order to elute the adsorbers Rd and Rc, the valves Vd5 and Vc5 already being open.

The step j3 is a step of waiting for approximate equalisation of the pressures of the adsorber Rg and of the adsorber Rh: at the start of the step j3, the valves Vh6 and Va6 are opened in order to start the pressure balancing between these adsorbers Ra and Rh. The step j3 then continues until the pressures of the adsorbers Ra and Rh are substantially equal.

The step j4 is a step of waiting for approximate equalisation of the pressures of the adsorber Rb and of the adsorber Rg: at the start of the step j4, the valves Vh6 and Va6 are closed; this step extends until the pressures of the adsorbers Rb and Rg are substantially equal.

The step j5 is a waiting step, at the start of which:

the balancing between the adsorbers Rb and Rg having been achieved, the valve Vb3 is closed but the valve Vc3 is opened in order to start the balancing between the adsorbers Rg and Rc;

the valves Vh6 and Vb6 are opened in order to start the balancing between the adsorbers Rg and Rc; and the valves Vc4 and Vc5 are closed to end the elution of the adsorber Rc.

This step j5 extends until the pressures of the adsorbers Rh and Rb are substantially equal, the pressures of the adsorbers Rg and Rc are also substantially equal and the pressure of the adsorber Re is substantially equal to the low pressure of the cycle.

The step j6 is a valve movement step including the instructions for closing the valve Va7, for closing the valves Vh6 and Vb6, the balancing of the adsorbers Rh and Rb being finished, for closing the valves Vg3 and Vc3, the balancing of the adsorbers Rg and Rc being finished, and for closing the valve Vf4 to stop using the flow coming from the adsorber Rf in order to elute the adsorber Rd.

It should be noted that the instructions of the step j6 may be incorporated in the step j1, in which case the latter also includes the instructions for closing additional valves not shown in FIG. 2.

The conditions 9 for branching from steps j3 to j4, j4 to j5 and j5 to j6 are designed to test correct switching of the valves controlled in the step in progress or which precedes them. If all these switching operations are carried out without incident, the sequence progresses from one step to the next step, as indicated by the arrows in FIG. 4. In the converse case, the sequence S is interrupted and a transient sequence S", which will be detailed below, is implemented.

The normal-mode control sequencer of the plant 10 is then obtained by matching with each mobile parameter the adsorber number associated with the phase time actually taking place. To that end, the following correspondence table may be used, which is read from left to right, row by row:

|  | a | b | c | d | e | f | g | h | i | j |
|---|---|---|---|---|---|---|---|---|---|---|
| 1st phase time | R2 | R3 | R4 | R5 | R6 | R7 | R8 | R9 | R0 | R1 |
| 2nd phase time | R3 | R4 | R5 | R6 | R7 | R8 | R9 | R0 | R1 | R2 |
| 3rd phase time | R4 | R5 | R6 | R7 | R8 | R9 | R0 | R1 | R2 | R3 |
| 4th phase time | R5 | R6 | R7 | R8 | R9 | R0 | R1 | R2 | R3 | R4 |
| 5th phase time | R6 | R7 | R8 | R9 | R0 | R1 | R2 | R3 | R4 | R5 |
| 6th phase time | R7 | R8 | R9 | R0 | R1 | R2 | R3 | R4 | R5 | R6 |

-continued

|  | a | b | c | d | e | f | g | h | i | j |
|---|---|---|---|---|---|---|---|---|---|---|
| 7th phase time | R8 | R9 | R0 | R1 | R2 | R3 | R4 | R5 | R6 | R7 |
| 8th phase time | R9 | R0 | R1 | R2 | R3 | R4 | R5 | R6 | R7 | R8 |
| 9th phase time | R0 | R1 | R2 | R3 | R4 | R5 | R6 | R7 | R8 | R9 |
| 10th phase time | R1 | R2 | R3 | R4 | R5 | R6 | R7 | R8 | R9 | R0 |

Arbitrarily, the first phase time indicated in this table is the one when the adsorber R1 is master, that is to say during this first phase time j is replaced by 1, likewise a is replaced by 2, b by 3, etc., until replacing i by 0. The steps j1 to j7 of the sequence S are run by matching each parameter with its corresponding adsorber number along the first row of the correspondence table: all of the control steps described above with reference to FIGS. 3I to 3X are then available. This sequence S is then rerun by matching each parameter with its adsorber number along the second row of the table, and so on until the tenth row.

In this way, each of the adsorbers R1 to R0 follows the succession of the ten phase times of a cycle over the duration T of the cycle, ensuring cyclic operation of the plant 10.

Thus, obtaining the normal-mode sequencer of the control unit 8 by the method according to the invention requires implementation of the adsorber control steps for only a single sequence, that is to say for a single phase time of the cycle, in contrast to the aforementioned sequencer of the plants found in the prior art, for which it is necessary to implement all of the adsorber control steps over the entire cycle. In other words, the method according to the invention makes it possible to obtain the normal-mode sequencer by extrapolation on the basis of the control steps which take place during a single phase time of the cycle. The working time for implementing the sequencer is greatly reduced by this, specifically by a factor of 10 for a plant having ten adsorbers in operation.

In addition, the definition of a single parameterized sequence limits the risks of errors in the sequencer of the control unit 8. Indeed, it is merely necessary to ensure that the parameterized sequence S contains no error in order to ensure that all of the steps of the sequencer obtained for cycle also contain no errors. The operational reliability of the plant according to the invention is therefore improved by this.

Furthermore, the control method according to the invention can advantageously be applied to the case of exceptional-mode operation of the plant in FIG. 1. Assuming that, for example, one of the ten adsorbers of the plant 10 is isolated, for example the adsorber R3, for example for reasons of maintenance or mechanical incidents, the plant 10 now operates with only nine adsorbers. Its control unit 8 then needs to make the plant follow a so-called exceptional mode. The cycle of the plant is then, for example, the one schematically represented in FIG. 5.

To that end, in order to obtain an exceptional-mode sequencer, the method according to the invention introduces a parameter for identifying the isolated state of an adsorber. This parameter is referred to as "fixed", in so far as it can only correspond in time to a single adsorber which is isolated. This parameter will be denoted u below.

In the same way as before, a mobile parameter for identifying an operating state of the adsorber which is in each of the phase times of the exceptional-mode cycle is associated with this phase time. For the plant 10 with nine adsorbers in operation, the mode cycle has a duration T differing in value from the duration T of the normal-mode cycle in FIG. 2, and it has nine phase times, the nine associated parameters indicated on the abscissa in FIG. 5 being noted k, l, m, n, p, q, r, s and t below.

Figure 5:
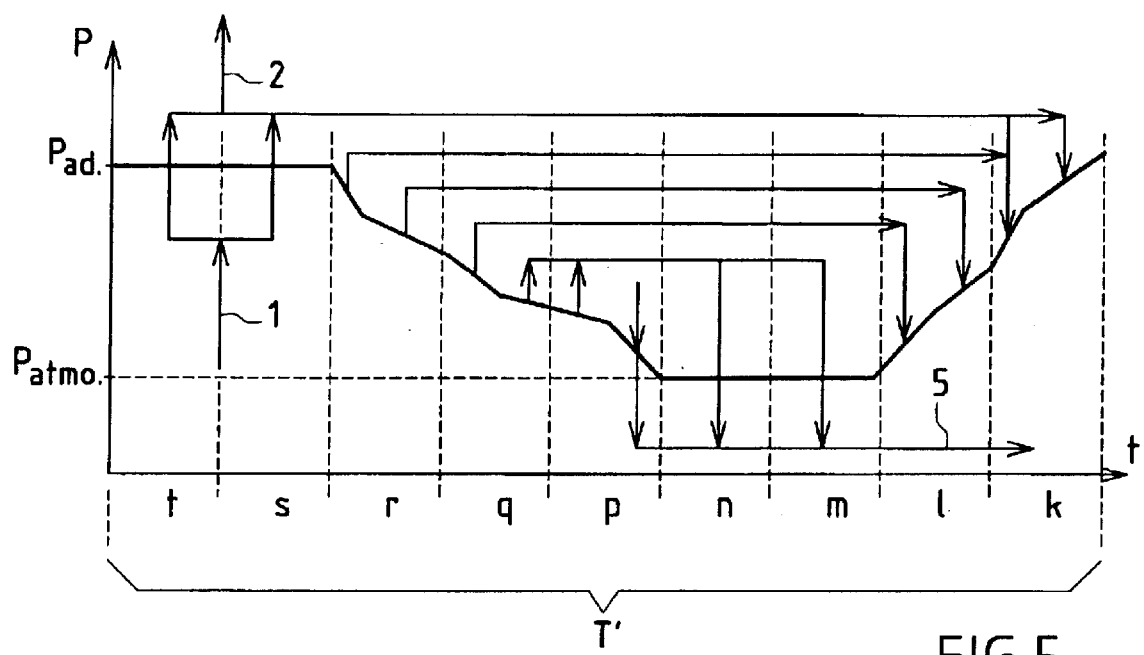
FIG. 5 is a diagram similar to the one in FIG. 2, illustrating an operating cycle in an exceptional mode of the plant in FIG. 1.
Figure 6:
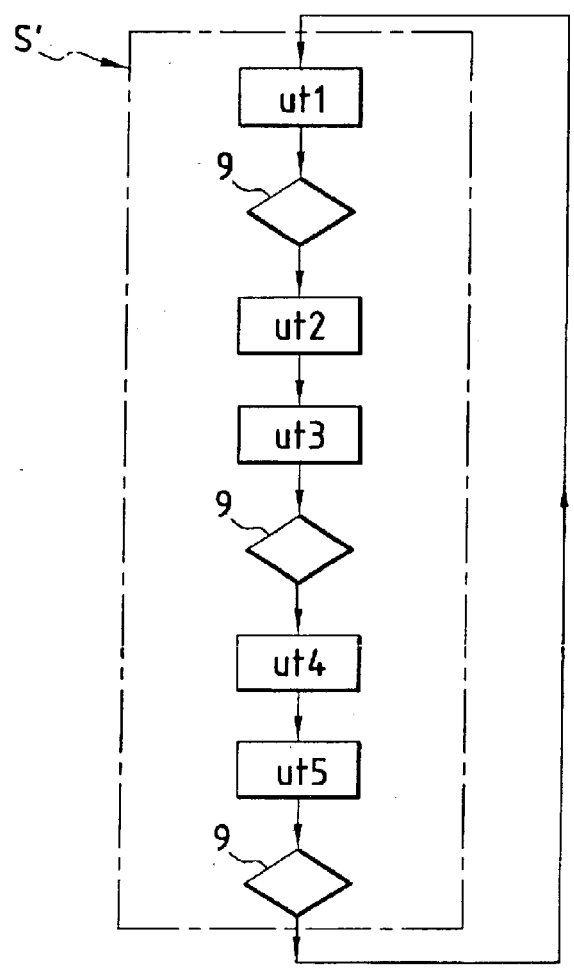
FIG. 6 is a flow chart explaining a parameterized sequence of an exceptional mode of the plant in FIG. 1.

An exceptional-mode sequence S' is then defined for a single given phase time, in the same way as explained above for the sequence S. The sequence S' in FIG. 5 is defined, which has for example five steps. Advantageously, these five steps are respectively noted ut1, ut2, ut3, ut4 and ut5, taking as a notation convention that the first character of the label of the step is the fixed parameter for an isolated state, the second character is the mobile parameter for a "master" state and the third character is an increasing step number.

Then, during each phase time of the cycle, each parameter is matched with the associated adsorber of the phase time in question, hence generating the exceptional-mode sequencer at the end of nine successive sequences. To that end, ten possible correspondence tables are available, depending on the which adsorber is actually isolated. In the event that the adsorber R3 is isolated, this correspondence table is as follows:

|  | k | l | m | n | p | q | t | s | t | u |
|---|---|---|---|---|---|---|---|---|---|---|
| 1st phase time | R5 | R6 | R7 | R8 | R9 | R0 | R1 | R2 | R4 | R3 |
| 2nd phase time | R6 | R7 | R8 | R9 | R0 | R1 | R2 | R4 | R5 | R3 |
| 3rd phase time | R7 | R8 | R9 | R0 | R1 | R2 | R4 | R5 | R6 | R3 |
| 4th phase time | R8 | R9 | R0 | R1 | R2 | R4 | R5 | R6 | R7 | R3 |
| 5th phase time | R9 | R0 | R1 | R2 | R4 | R5 | R6 | R7 | R8 | R3 |
| 6th phase time | R0 | R1 | R2 | R4 | R5 | R6 | R7 | R8 | R9 | R3 |
| 7th phase time | R1 | R2 | R4 | R5 | R6 | R7 | R8 | R9 | R0 | R3 |
| 8th phase time | R2 | R4 | R5 | R6 | R7 | R8 | R9 | R0 | R1 | R3 |
| 9th phase time | R4 | R5 | R6 | R7 | R8 | R9 | R0 | R1 | R2 | R3 |

This table is read in the same way as the correspondence table associated with the normal mode of the plant. It will be noted that the parameter u always corresponds to the adsorber R3, for all the phase times of the cycle.

The control method according to the invention hence makes it possible to obtain an exceptional-mode control sequencer of the plant 10 by implementing only the steps relating to a single phase time of the cycle, in contrast to the prior-art sequencers for which it is necessary to manually implement all of the control steps of the entire cycle, and to do so for all ten envisageable exceptional modes.

With the example of a five-step sequence S', the method according to the invention requires the definition of only five control steps for the nine adsorbers in operation, for the ten envisageable exceptional modes, in contrast to the roughly 450 steps necessary for a sequencer of a prior-art plant.

In addition, the notation of the exceptional-mode control steps makes it possible to ascertain the adsorber isolated by the control unit 8, in the event that this isolation results from an automated initiative by this control unit, for example in response to the automatic detection of a fault.

As a variant, it is envisageable to plan for the case in which two adsorbers are isolated, with the plant 10 now operating over only eight adsorbers. It is expedient to introduce two fixed parameters for identifying the isolated states of these adsorbers.

Furthermore, with a view to ensuring better reliability and responsiveness of the control unit 8 of the plant 10, it is desirable to introduce sequences for transition between the normal mode and an exceptional mode, such as the transition sequence S" represented in FIG. 7.

This sequence S" has, for example, three steps which are implemented beforehand in the control unit 8 and make it possible to branch from the step j3 of the normal-mode sequence S to the step ut1 of the exceptional-mode sequence S'.

Although not shown, other transition sequences may also be provided for each of the branching conditions 9 of the sequence S, or alternatively for only some of the branching conditions, the same transition sequence being useable for several of these branching conditions 9, at least for some of the steps of this sequence. For instance, FIG. 7 represents in dashes the transition from the step j5 of the sequence S to the step ut1 of the sequence S' by passing through only the step jfa3 of the represented sequence S".

The method according to the invention therefore makes it possible to implement only the transition sequence or sequences relating to the change from a single phase time of the normal-mode cycle to a single phase time of the exceptional-mode cycle of the plant. For the example of the parameterized sequence S in FIG. 4, it is only necessary to define at most four transition sequences.

Advantageously, the notation of each control step of the transition sequence S" complies with the convention according to which:

the first character is the mobile parameter corresponding to the master adsorber at the moment when the transition is initiated;

the second character is the fixed parameter corresponding to the isolated adsorber, this parameter being mobile before the transition is initiated;

the third character corresponds to the mobile parameter corresponding to the adsorber which will be the master when the exceptional mode S' is started; and the fourth character is an increasing step number.

In this way, the parameterization of the sequences S, S' and S" of the control unit 8 makes it possible always to know what operating state the plant 10 is in, even in transient mode, simply from the label of the control step in progress, since this numbering makes it possible to know "where one is coming from and where one is going".

As a variant (not shown) of the method, is it envisageable for half the adsorbers to be isolated (for a plant with N adsorbers, N being odd, this equates to isolating N+½ adsorbers), in particular during general maintenance operations of the processing plant. In this case, the exceptional-mode sequencer is a so-called "maintenance" sequencer.

The method according to the invention can of course be applied to a processing plant having a plurality of adsorption units, these units having one (as the case of the plant 10 in FIG. 1) or more adsorbers, each adsorption unit being controlled by treating it as an adsorber.

What is claimed is:

1. Method of controlling a plant for processing a gas by adsorption, which plant (10) has N adsorption units (R1 to R0), N being greater than or equal to two, operating according to a cycle which is distributed uniformly into at most N phase times and during a part of which at least one of the adsorption units is subjected to the output flow of at least one of the other adsorption units, in which at least one control sequencer is used which determines the control steps of the N adsorption units (R1 to R0) over a cycle and which ensures, in a loop on itself, cyclic operation of the processing plant (10), and in which, on the basis of the control steps of the processing plant (10) which occur during a given phase time of a cycle of an operating mode of the plant, said sequencer of said operating mode is obtained by extrapolation to the other phase times of the cycle.

2. Method according to claim 1, wherein for this method:

a mobile parameter (a, b, . . . , j) for identifying the operating state of the adsorption unit (R1 to R0) which is in each successive phase time of the cycle is firstly associated with said phase time;

for said given phase time, a parameterized sequence (S, S') of control steps of the processing plant (10) during said given phase time is then defined, each adsorption unit (R1 to R0) controlled by the steps of said sequence being denoted by the parameter ($\underline{a}$, $\underline{b}$, . . . , $\underline{i}$) for identifying the operating state of said adsorption unit; and a control sequencer of the processing plant (10) is lastly generated by matching an adsorption unit (R1 to R0) with each mobile parameter ($\underline{a}$, $\underline{b}$, . . . , $\underline{i}$) of the parameterized sequence during each phase time of the cycle, so as to cause the succession of phase times of the cycle to be followed at all the adsorption units in operation.

3. Method according to claim 2, wherein a normal-mode control sequencer of the processing plant (10) is generated for N adsorption units in operation.

4. Method according to claim 3, wherein each step of the parameterized sequence (S) of the normal-mode sequencer is denoted by a mobile parameter J) and a step number.

5. Method according to claim 4, wherein for each isolated adsorption unit (R3), a fixed parameter ($\underline{u}$) for identifying the isolated state of said isolated unit (R3) is introduced before defining the parameterized sequence (S'), and in that when the control sequencer of the processing plant (10) is being generated, the or one of the isolated adsorption units (R3) is matched with the or each fixed parameter ($\underline{u}$) during all the phase times of the cycle, generating an exceptional-mode control sequencer of the processing plant (10).

6. Method according to claim 5, wherein at least one parameterized sequence (S") is provided for transition between the parameterized sequence (S) of the normal-mode sequencer and the parameterized sequence (S') of the exceptional-mode sequencer of the processing plant (10).

7. Method according to claim 3, wherein for each isolated adsorption unit (R3), a fixed parameter ($\underline{u}$) for identifying the isolated state of said isolated unit (R3) is introduced before defining the parameterized sequence (S3'), and in that when the control sequencer of the processing plant (10) is being generated, the or one of the isolated adsorption units (R3) is matched with the or each fixed parameter ($\underline{u}$) during all the phase times of the cycle, generating an exceptional-mode control sequencer of the processing plant (10).

8. Method according to claim 7, wherein at least one parameterized sequence (S") is provided for transition between the parameterized sequence (S) of the normal-mode sequencer and the parameterized sequence (S') of the exceptional-mode sequencer of the processing plant (10).

9. Method according to claim 8, wherein each step of the parameterized position transition sequence (S") is denoted by a mobile parameter ($\underline{i}$) of the sequence (S) of the normal-mode sequencer, the fixed parameter or parameters a ($\underline{f}=\underline{u}$), a mobile parameter ($\underline{t}$) of the sequence (S') of the exceptional-mode sequencer and a reference number.

10. Method according to claim 9, wherein the exceptional-mode sequencer is a maintenance-mode control sequencer of the processing plant (10) for substantially half the isolated adsorbers.

11. Method according to claim 9, wherein the generated sequencer is obtained by looping the parameterized sequence (S, S') on itself as many times as the cycle has phase times, and by matching the corresponding adsorption unit (R1 to R0) with each parameter during each loop.

12. Method according to claim 3, wherein at least one parameterized sequence (S") is provided for transition between the parameterized sequence (S) of the normal-mode sequencer and the parameterized sequence (S') of the exceptional-mode sequencer of the processing plant (10).

13. Method according to claim 12, wherein each step of the parameterized position transition sequence (S") is denoted by a mobile parameter ($\underline{J}$) of the sequence (S) of the normal-mode sequencer, the fixed parameter or parameters ($\underline{f}=\underline{U}$), a mobile parameter ($\underline{t}$) of the sequence (S') of the exceptional-mode sequencer and a reference number.

14. Method according to claim 3, wherein the generated sequencer is obtained by looping the parameterized sequence (S, S') on itself as many times as the cycle has phase times, and by matching the corresponding adsorption unit (R1 to R0) with each parameter during each loop.

15. Plant for processing a gas by adsorption, having on the one hand N adsorption units (R1 to R0), N being greater than or equal to 2, which operate according to a cycle which is distributed uniformly into at most N phase times and during a part of which at least one of the adsorption units (R1 to R0) is subjected to the output flow of at least one of the other adsorption units, said N adsorption units (R1 to R0) being connected to a pipe (1) for supplying gas to be processed, to a pipe (2) for producing processed gas, to a pipe (5) for collecting a residual gas flow, and being provided with pipes and valves both for connecting the adsorption units to one another and for connecting the adsorption units to the said supply, production and connection pipes; and on the other hand a unit (8) for controlling the plant (10), which defines at least one control sequencer of the adsorption units (R1 to R0), ensuring cyclic operation of the plant (10), in which at least one sequencer of the control unit (8) is obtained by applying the control method according to claim 3, and at least some of the connection valves are respectively denoted by a parameter of the parameterized sequence (S, S') generating at least one said sequencer of the control unit (8).

16. Method according to claim 3, wherein for each isolated adsorption unit (R3), a fixed parameter (u) for identifying the isolated state of said isolated unit (R3) is introduced before defining the parameterized sequence (S'), and in that when the control sequencer of the processing plant (10) is being generated, the or one of the isolated adsorption units (R3) is matched with the or each fixed parameter ($\underline{u}$) during all the phase times of the cycle, generating an exceptional-mode control sequencer of the processing plant (10).

17. Method according to claim 16, wherein each step of the parameterized sequence (S') of the exceptional-mode sequencer is denoted by the fixed parameter or parameters ($\underline{u}$), a mobile parameter ($\underline{t}$) and a step number.

18. Method according to claim 2, wherein the generated sequencer is obtained by looping the parameterized sequence (S, S') on itself as many times as the cycle has phase times, and by matching the corresponding adsorption unit (R1 to R0) with each parameter during each loop.

19. Method according to claim 18, wherein the corresponding adsorption unit (R1 to R0) is matched with each parameter ($\underline{a}$, $\underline{b}$, . . . , j; $\underline{k}$, $\underline{l}$, . . . , $\underline{t}$, $\underline{u}$) by means of a correspondence table.

20. Plant for processing a gas by adsorption, having on the one hand N adsorption units (R1 to R0), N being greater than or equal to 2, which operate according to a cycle which is distributed uniformly into at most N phase times and during a part of which at least one of the adsorption units (R1 to R0) is subjected to the output flow of at least one of the other adsorption units, said N adsorption units (R1 to R0) being connected to a pipe (1) for supplying gas to be processed, to a pipe (2) for producing processed gas, to a pipe (5) for collecting a residual gas flow, and being provided with pipes and valves both for connecting the adsorption units to one another and for connecting the adsorption units to the supply, production and connection pipes; and on the other hand a unit (8) for controlling the plant (10), which defines at least one control sequencer of the adsorption units (R1 to R0), ensuring cyclic operation of the plant (10), in which at least one sequencer of the control unit (8) is obtained by applying the control method according to claim 2, and at least some of the connection valves are respectively denoted by a parameter of the parameterized sequence (S, S') generating at least one said sequencer of the control unit (8).

21. Plant for processing a gas by adsorption, having on the one hand N adsorption units (R1 to R0), N being greater than or equal to 2, which operate according to a cycle which is distributed uniformly into at most N phase times and during a part of which at least one of the adsorption units (R1 to R0) is subjected to the output flow of at least one of the other adsorption units, said N adsorption units (R1 to R0) being connected to a pipe (1) for supplying gas to be processed, to a pipe (2) for producing processed gas, to a pipe (5) for collecting a residual gas flow, and being provided with pipes and valves both for connecting the adsorption units to one another and for connecting the adsorption units to the supply, production and connection pipes; and on the other hand a unit (8) for controlling the plant (10), which defines at least one control sequencer of the adsorption units (R1 to R0), ensuring cyclic operation of the plant (10), in which at least one sequencer of the control unit (8) is obtained by applying the control method according to claim 2, and at least some of the connection valves are respectively denoted by a parameter of the parameterized sequence (S, S') generating at least one said sequencer of the control unit (8).

22. Plant according to claim 21, wherein the valves denoted by a parameter of the parameterized sequence (S, S') are distributed into sets of valves as a function of the use of the gas which passes through the valves of the same set, and in that each of the valves denoted by a parameter is also denoted by the number of the set to which the corresponding valve belongs.

* * * * *

UNITED STATES PATENT AND TRADEMARK OFFICE
CERTIFICATE OF CORRECTION

PATENT NO. : 6,733,568 B2
DATED : May 11, 2004
INVENTOR(S) : Guillaume De Souza, Pierre-Olivier Dolle and Yves Engler It is certified that error appears in the above-identified patent and that said Letters Patent is hereby corrected as shown below:

Column 11,
Lines 5 and 10, please replace the reference "i" with -- j --.
Line 19, please replace the reference "J)" with -- (j) --.
Line 37, please replace the reference "(S3')" with -- (S') --.
Line 52, please delete the word "a".
Line 50, please replace the reference "(i)" with -- j --.

Column 12,
Line 3, please replace the reference "(J)" with -- (j) --.
Line 5, please replace the reference "(f=U)" with -- (f=u) --.
Line 33, please replace the words "claim 3" with -- claim 2 --.
Line 34, please replace the reference "(u)" with -- (u) --.
Line 43, please replace the words "claim 16" with -- claim 3 --.
Line 54, please replace the reference "j" with -- j --.

Signed and Sealed this

Nineteenth Day of July, 2005

JON W. DUDAS
*Director of the United States Patent and Trademark Office*